United States Patent [19]

Labeye et al.

[11] Patent Number: 5,612,815
[45] Date of Patent: Mar. 18, 1997

[54] OPTICAL DEVICE FOR OPTOMECHANICAL APPLICATION

[75] Inventors: Pierre Labeye; Eric Ollier, both of Grenoble, France

[73] Assignee: Commissariat A L'Energie Atomique, Paris, France

[21] Appl. No.: 584,372

[22] Filed: Jan. 11, 1996

[30] Foreign Application Priority Data

Jan. 10, 1995 [FR] France ................. 95 00201

[51] Int. Cl.$^6$ ................. G02F 1/29; G02B 6/26
[52] U.S. Cl. ................. 359/320; 359/618; 385/16; 385/17; 385/20
[58] Field of Search ................. 385/14, 16, 17, 385/20, 21, 22, 23; 359/618, 320

[56] References Cited

U.S. PATENT DOCUMENTS

| | | | |
|---|---|---|---|
| 4,607,910 | 8/1986 | Thurenius | 350/96.2 |
| 4,610,504 | 9/1986 | Thurenius et al. | 350/96.26 |
| 4,998,791 | 3/1991 | Koai | 350/96.14 |
| 5,002,354 | 3/1991 | Koai | 350/96.14 |
| 5,024,500 | 6/1991 | Stanley et al. | 350/96.15 |
| 5,078,514 | 1/1992 | Valette et al. | 385/20 |
| 5,454,058 | 9/1995 | Mace et al. | 385/122 |

Primary Examiner—Mark Hellner
Attorney, Agent, or Firm—Burns, Doane, Swecker & Mathis, LLP

[57] ABSTRACT

Optomechanical device comprising in an integrated optics guiding structure, a fixed part and a mobile part, which is connected to the fixed part, said mobile part being located between i output microguides formed in the fixed part and j input microguides also formed in the fixed part, characterized in that the mobile part comprises a mass, which is only connected by fixing arms to the fixed part, so as to permit the displacement of the mass in a first direction, said mass having k microguides to permit the switching of a light beam from one of the j input microguides to one of the i output microguides.

24 Claims, 8 Drawing Sheets

OPTICAL DEVICE FOR OPTOMECHANICAL APPLICATION

TECHNICAL FIELD OF THE INVENTION

The present invention relates to the field of optomechanics, i.e. all integrated optics components associated with a mechanical structure etched in the same material. Even if the fields of integrated optics and micromechanics, considered separately, have been well developed, the combination of the two, i.e. optomechanics is a recent development.

The present invention applies to optomechanics in various fields, such as optical telecommunications or optomechanical sensors (e.g. optomechanical accelerometry).

PRIOR ART

Any optomechanical function necessarily passes through the relative displacement of the end of an optical guide with respect to the end of another optical guide. In the case of optomechanical switching, said displacement is externally controllable. In the case of optomechanical sensors, it is the physical phenomenon to be measured (acceleration, vibration, etc.), which will give rise to this displacement of the guide end.

In addition, an optomechanical system using integrated optics requires the deposition of thin layers or films on a substrate. As a result of the methods and materials used, the thus formed layers have stresses in their thickness, e.g. linked with the expansion coefficient difference as a function of the temperature and said stresses can also be inhomogeneous. This leads to a parasitic deformation of the system, which is prejudicial to the production of optomechanical devices. In general, integrated optics cannot accept such deformations, which can lead to the offsetting or displacement of the optical guide structures with respect to one another. Thus, in such structures, displacements of approximately 1 micron lead to significant optical losses.

In the field of optomechanics, the prior art proposes mechanical structures with a beam containing an optical guide fixed to one end of the fixed structure of the device and free at the other end. Such a device is described in French patent FR-A-2 660 444 (U.S. Pat. No. 5 078 514). The structure of the switch described in this patent will now briefly be described in conjunction with FIG. 1.

Figure 1:
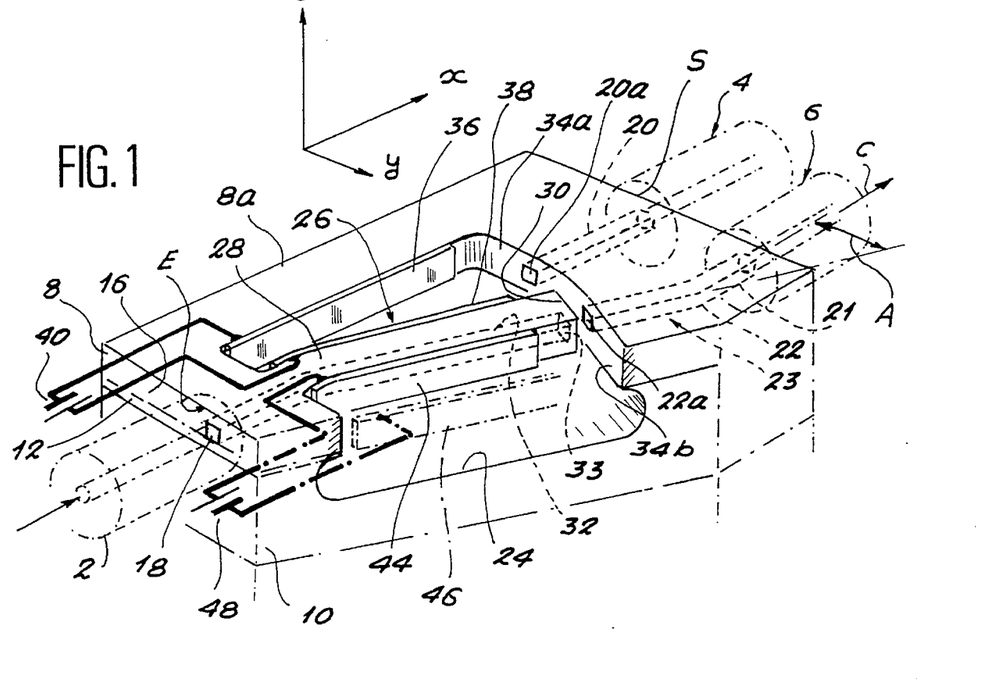
FIG. 1 A prior art optomechanical switch.

The switch has a planar layer or guide structure 8 (which can be formed from one or more layers), which is produced on a substrate 10, e.g. of monocrystalline silicon and which has an input face E and an output face S, e.g. obtained by cleaving. The guide structure 8 e.g. has a 8 to 12 µm thick silicon oxide buffer layer 12 and a 2 to 10 µm thick upper, silica layer 16 and in certain applications the latter can be replaced by air. The guide structure also comprises an input microguide 18 and two output microguides 20, 22, made from silicon oxide and e.g. doped with phosphorus, having a height of 2 to 6 µm and a width of 2 to 8 µm. The microguides 18 and 20 are parallel to a direction x, which is itself parallel to the largest surface 8a of the planar layer or guide structure 8 and they are arranged in the extension of one another and on either side of a cutout 24 traversing the guide structure 8. Another output microguide 22 is located on the same side of the cutout 24 as the microguide 20 and adjacent to the latter. On the side of the switch output S, said microguide 22 has a part 21 strictly parallel to the microguide 20 and, on the side of the cutout 24, a part 23 forming a reflex angle A with the part 21, having a value between approximately 0.06° and 6°, said value being linked with the beam length.

Other structures can be used, e.g. those obtained by ion exchange in glass-type or lithium niobate-type structures, or by deposition or etching layers of the silica type, $Si_3N_4$, $SiO_xN_y$, AsGa, InP, etc., the lateral confinement in the microguide not necessarily being obtained by the etching of the layer forming the microguide.

In the fixed structure 8, the cutout 24 defines a flexible beam 26 oriented in the inoperative state parallel to the direction x and said beam is able to deform in the cutout 24 in a direction y, parallel to the surface 8a of the guide structure (which defines a fixed part) and perpendicular to the direction x. This beam 26 has a fixed end 28 integral with the guide structure 8 and a free end 30 able to move in the cutout 24. In the extension of the input microguide 18, a central microguide 32 extends over the entire length of the beam 26, its end 33 issuing at the end 30 of the latter.

The switching of the incident beam carried by the input microguide to the output microguide 20 is ensured by bringing the free end 33 of the central microguide of the beam in front of and coinciding with the input end 20a of the output microguide 20. The switching to the output microguide 22 takes place by bringing the free end 33 of the central microguide in front of and coinciding with the input end 22a of the output microguide 22. The inner wall of the cutout 24, facing the free end 30 of the beam, is formed from two parts 34a, 34b forming a reflex angle with a value close to or identical to the angle A. The deformations of the beam can make the latter coincide with one or other of the output microguides is ensured in the embodiment of FIG. 1 by using variable capacitance capacitors. For this purpose, the lateral surfaces of the cutout 24, level with the guide structure 8, oriented in the direction x, are equipped with respective metallizations 36 and 46. The lateral, facing faces of the beam 26 oriented substantially in the direction x, when the beam is inoperative, have respective metallizations 38, 48. The metallizations 36 and 38 are connected to an electric power supply 40, whilst the metallizations 44, 46 are connected to an electric power supply 48. The application of a suitable voltage to the terminals of the thus formed capacitor pair creates a capacitive force orthogonal to the planes formed by the metallizations, which is substantially parallel to the direction y and brings about a deformation of the beam 26 in said direction y. This force $F_c$ permits a lateral displacement $y_c$ of the free end of the beam 26 in accordance with y, which is given by the equation:

$$y_c = 3/2 \cdot F_c \cdot h^{-1} \cdot \left(\frac{L}{l}\right)^3 \cdot E^{-1}$$

in which E is Young's modulus, l the width of the beam in direction y, L the length of the beam in direction x and h the thickness of the beam in direction z.

The process for the production of said structure is described in the aforementioned patent and involves:

- a stage of forming the layer 12, e.g. by thermal oxidation of the substrate 10,
- the deposition of a silica layer by LPCVD or PECVD,
- an etching stage performed through a mask defined by photolithography to obtain the microguides,
- a stage of depositing the layer 16 by low pressure chemical vapour deposition (LPCVD) or plasma assisted chemical vapour deposition (PECVD),
- anisotropic and isotropic etching stages of the reactive ionic etching type either with $CHF_3$, or $SF_6$, said latter etching stages permitting the freeing of the beam 26 from its substrate.

A first problem encountered with such a device is the need, when it is wished to bring about a switching of n optical guides to m optical guides, to use at least two beams, like those described hereinbefore and which are cascade-connected.

Figure 2:
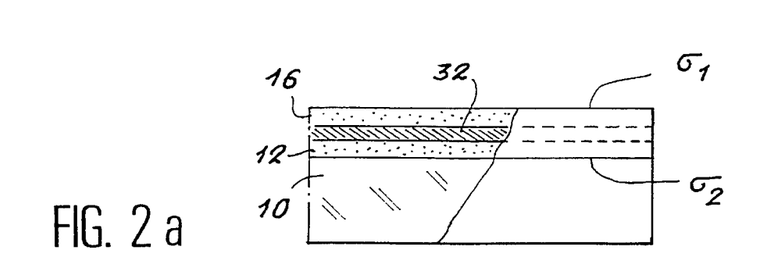
FIGS. 2a & 2b Stages in producing a prior art optomechanical switch before (FIG. 2a) and after (FIG. 2b) etching the substrate.

Moreover, the stage of producing the in particular silica beam by PECVD with different phosphorus doping operations, leads to a stress gradient in the vertical direction z, which gives rise to a deformation of the system. This is illustrated in FIG. 2a, where identical numerical references to those of FIG. 1 indicate the same elements. FIG. 2a shows the structure obtained prior the beam freeing stage. In FIG. 2a, $\sigma_2$ designates the stress at the interface between the substrate 10 and thin layer (12, 32, 16) and $\sigma_1$ the stress at the thin layer surface. Due to the differences of nature between the sublayers 12, 32 and 16, as well as the phosphorus doping differences in the layer, there is a stress gradient in the thin layer, the stress $\sigma_2$ being lower than the stress $\sigma_1$. Thus, on freeing the beam 26, i.e. when hollowing out the cavity 24 beneath the beam 26, there is a vertical deviation of said beam, which completely offsets the input and output optical guides, so that the optical switch is rendered inoperative, as is illustrated in FIG. 2b.

Switching also requires the deformation of the beam (in the plane xy, cf. FIG. 1), whereof one end is attached to the fixed part, which, combined with the fact that the beam contains a microguide and must therefore have minimal dimensions, means that the mobile part requires a high control energy during its movement.

The problems which arise in the field of sensors, e.g. vibration pick-ups, are the same as those occurring for switches with respect to the deformations (cf. FIGS. 2a and 2b). The fact that there again a signal is obtained by the displacement of a beam attached to a fixed part leads to a limitation in the sensitivity of the sensors (said beam, for the reasons given hereinbefore, having to have minimal dimensions).

Moreover, in the field of sensors, the prior art proposes a mobile structure with a single optical guide. The mobile structure is moved under the action of an external force. This device modules the light intensity passing through it, but said modulation does not permit a displacement.

DESCRIPTION OF THE INVENTION

In order to solve these problems, the present invention relates to an optomechanical device comprising in an integrated optics guiding structure, a fixed part and a mobile part, which is connected to the fixed part, said mobile part being located between i output microguides formed in the fixed part and j input microguides also formed in the fixed part, characterized in that the mobile part comprises a mass, which is only connected by fixing arms to the fixed part, so as to permit the displacement of the mass in a first direction, said mass having k microguides to permit the switching of a light beam from one of the j input microguides to one of the i output microguides.

With such a structure, it is possible to choose input and output microguides i and j with a random number. It is no longer necessary to have switching device cascades. As the mobile part is completely disconnected from the fixed part, it can be displaced with a much lower energy than with a beam like that described in FR-A-2 660 444. Finally, in the case where said device is used in a sensor, the sensitivity of the latter is increased through the disconnection of the two mobile and fixed parts. The fixing arms of the mobile part and the fixed part are not traversed by waveguides, so that it is possible to dimension them without being in any way dependent on the presence of such microguides.

It is possible to produce cascade structures with mobile parts connected to the fixed part solely by fixing arms, said mobile parts then only requiring little energy for their displacement and in the case of the sensor offer a greater sensitivity.

Thus, the invention also relates to an optomechanical device comprising, in an integrated optics guide structure, a fixed part and N mobile parts $M_1, M_2, \ldots, M_N$, connected to the fixed part, said mobile parts being positioned between j input microguides formed in the fixed part and i output microguides also formed in the fixed part, characterized in that each of the mobile parts has a mass, which is only connected by fixing arms to the fixed part, so as to permit the displacement of each mass in a first direction, the mass $M_1$ having $k_1$ microguides so as to permit the switching of a light beam from one of the j input microguides to one of the $k_2$ microguides of the mass $M_2$, each mass $M_n$ ($N>n\geqq2$) having $k_n$ microguides so as to be able to switch a light beam from one of the $k_{n-1}$ microguides of the mass $M_{n-1}$ to one of the $k_{n+1}$ microguides of the mass $M_{n+1}$, the mass $M_N$ having $k_N$ microguides so as to be able to switch a light beam from one of the $k_{N-1}$ microguides of the mass $M_{N-1}$ to one of the i output microguides located in the fixed part.

According to a said device, the arms are not traversed by waveguides and can be dimensioned independently of the presence of microguides.

Within the scope of the present invention, in order to further reduce possible residual stress gradients in a mobile structure, it is possible to connect said structure by at least two points to the fixing arms.

A fixing arm has an optimum configuration when it contributes both to the solving of the problem of rigidity so as to limit the deformations of a mobile part in a second direction and the problem of minimal energy (or maximum sensitivity for the sensors) when said arm has an adequate flexibility in said first direction. Thus, the flexibility in the first direction permits a displacement of the mass to which the arm is connected, without hindering the displacement of said mobile part in said first direction. An adequate rigidity in the second direction, in accordance with which the deformations can occur, makes it possible to limit the deformations of the mobile part in said second direction.

The first and second directions can be perpendicular to one another.

An arm can also have various shapes:
- an angle bracket shape with two segments perpendicular to one another,
- a U shape with a branch added so as to be substantially perpendicular to the free end of each lateral branch of the U,
- a straight shape.

In addition, according to an embodiment, at least two arms can connect a same mobile part to the fixed part by means of a deformable frame.

So as to solve, within the scope of the present invention, the problem of the weight of a mobile part, the latter can have, apart from the microguides which it contains, at least one cutout permitting the lightening thereof.

The invention also relates to an optomechanical switch incorporating a device like that described hereinbefore and means for controlling the displacement of the or at least one of the mobile parts.

Said means can be electrostatic means, e.g. control electrodes applied to the arms of the mobile part or at least one mobile part.

According to a variant, the means for controlling the displacement of a mobile part can be constituted by an electrostatic transducer connected to said mobile part.

The invention also relates to an optomechanical sensor having a device like that described hereinbefore with, in an advantageous embodiment, i=2, j=1 and k=2.

BRIEF DESCRIPTION OF THE DRAWINGS

The features and advantages of the invention can be better gathered from the following description with respect to non-limitative embodiments and relative to the attached drawings, wherein show.

DETAILED DESCRIPTION OF EMBODIMENTS

Figure 3A:
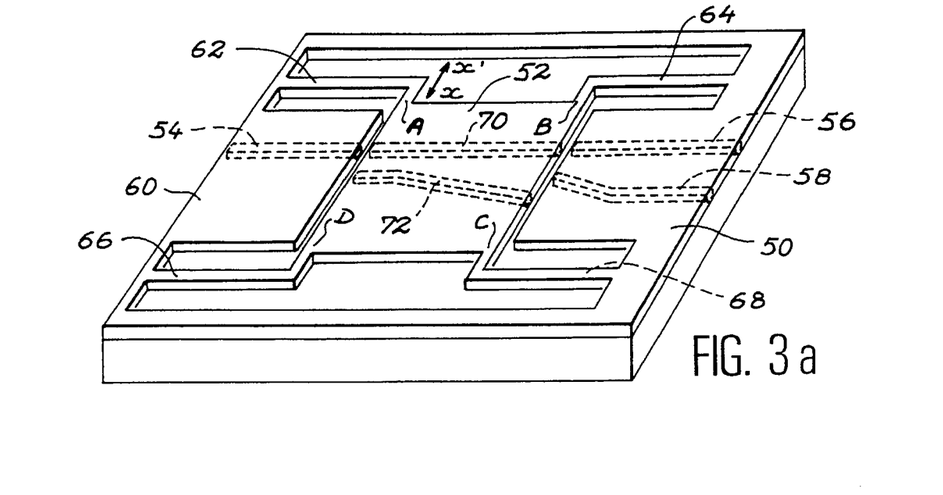
FIGS. 3a & 3b The principle of a switch according to the invention for an input microguide and two output microguides.
Figure 3B:
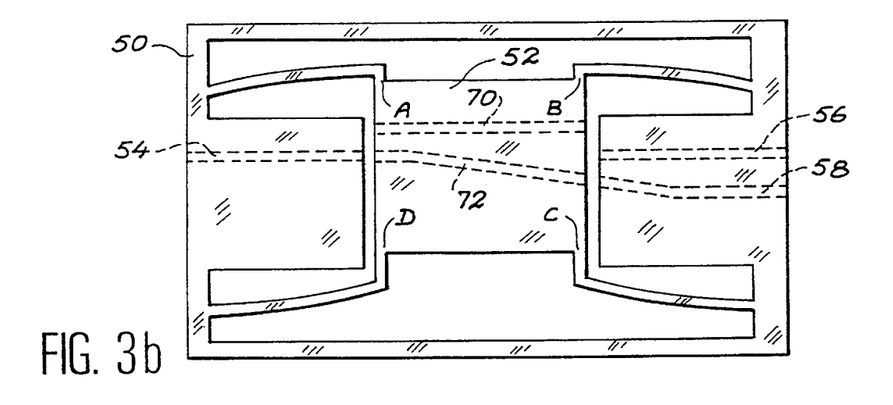

The principle of the invention will now be described in conjunction with FIGS. 3a and 3b showing, in plan view, a device having a fixed part 50 and a mobile part 52, the fixed part having an input microguide 54 and two output microguides 56, 58. The fixed structure 50 is similar to that described in conjunction with FIG. 1. Only the shape of the etched area is modified, so as to free a mobile structure 52, which is no longer directly connected to the area 60 of the fixed part containing the input microguide 54. However, the mobile part 52 is connected to the fixed part 50 by fixing arms 62, 64, 66, 68. These arms must permit the displacement of the mobile part in a first direction. In the case of FIGS. 3a and 3b, said first direction XX' is contained in a horizontal plane and is advantageously perpendicular to the input microguide 54. The mobile part 52 contains two microguides 70, 72. The guide 70 has one end facing the input microguide 54 and the other end facing the output microguide 56, when the structure is in a position I illustrated by FIG. 3a. During the displacement of the structure in accordance with XX' into a position II illustrated in FIG. 3b, the first microguide 70 leaves its position facing the input and output microguides 54, 56, but the second microguide 72 comes into a position in which one of its ends faces the input microguide 54 and in which its second end faces the output microguide 58. To pass from position I to position II, displacement means, not shown in FIGS. 3a and 3b, can be provided (this is the case with the optical switch). The displacement of the mobile part 52 can also take place under the influence of an external disturbance, which is to be identified and measured (this is the case of the sensor).

In all cases, the connecting arms 62, 64, 66, 68 contain no optical guide.

Thus, they can have a relatively small width. Therefore in the case of the optical switch, the energy necessary for the displacement of the mobile part will be much lower than in the prior art devices.

It is also possible to connect the mobile structure by at least two points to the fixed structure, so as to minimize the residual stress gradients which can be present in the mobile part. In FIGS. 3a and 3b, there are four connection points designated by the letters A, B, C, D.

The optical microguides of the mobile part can have very variable shapes. In FIGS. 3a and 3b, one of the two microguides is linear, whereas the second has a bend.

Figure 4:
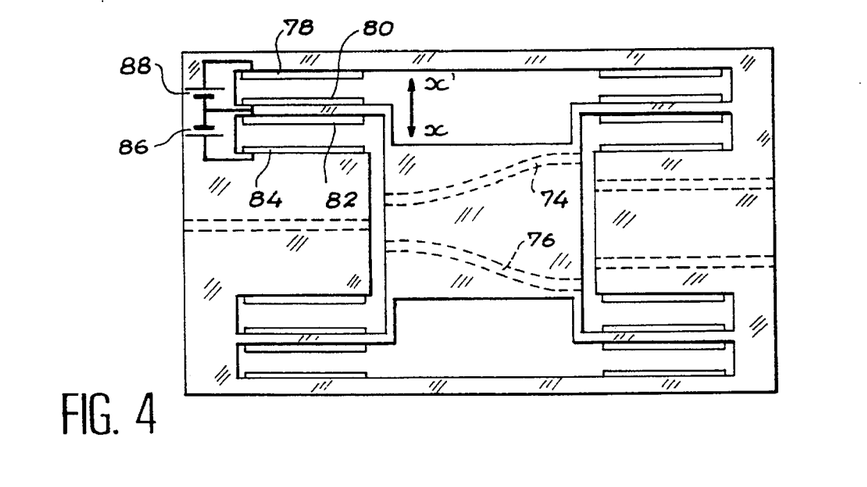
FIG. 4 A device whose mobile part has two curved guides with an electrostatic control system.

It is also possible to have curved microguides in the mobile part, as illustrated in FIG. 4, where the displacement still takes place in direction XX' contained in the plane of the drawing and advantageously perpendicular to the input microguide.

In the case of the optical switch, means must be provided for displacing the mobile part with respect to the fixed part and for bringing about switching between various positions. To this end it is possible, as illustrated in FIG. 4, to use control electrodes such as the electrodes 78, 80, 82, 84. Certain of these electrodes are deposited on the fixed part and others on the mobile part. They are controlled by electric power supplies 86, 88. FIG. 4 shows a single control electrode array, in relation to an arm for connecting the mobile part to the fixed part. Other electrodes can be deposited on other arms and on the other areas of the fixed part facing said other arms. Corresponding electric power supplies will be associated therewith.

Figure 5A:
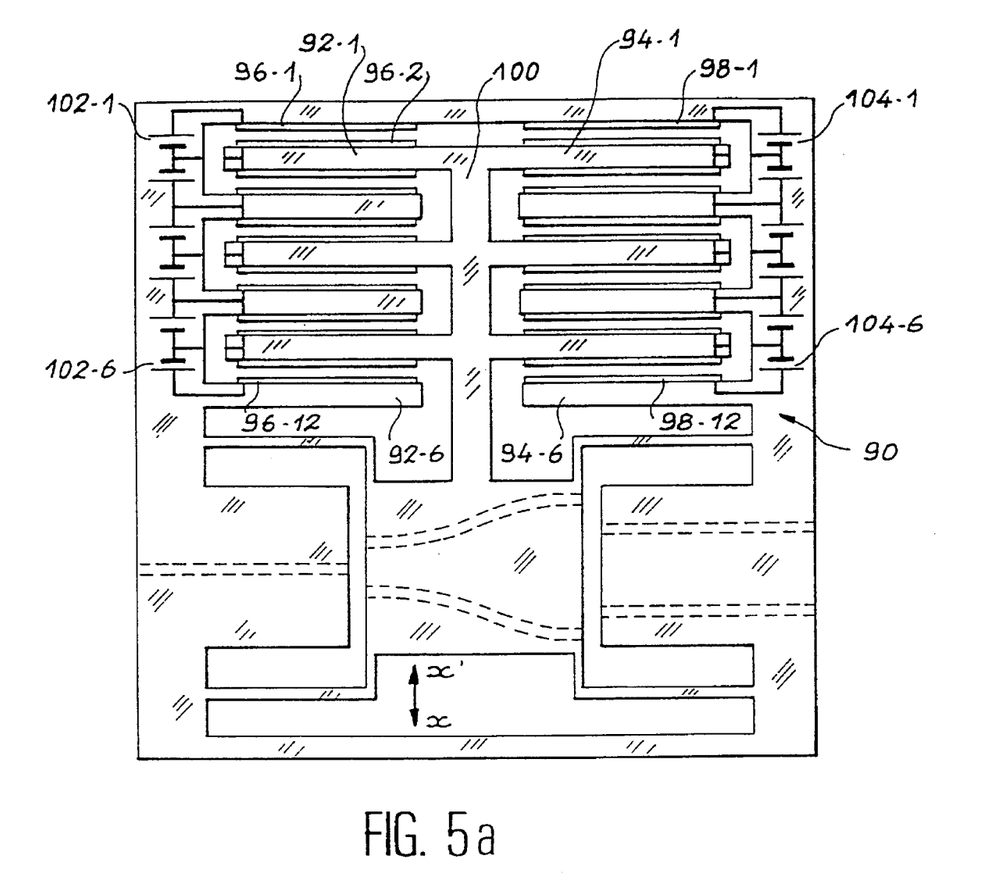
FIG. 5a An optomechanical switch with an electrostatic transducer.

According to a variant, it is possible to reduce the control voltage by introducing an electrostatic transducer, as illustrated in FIG. 5a. In FIG. 5a, the input, output and switching microguides, as well as the connecting arms are identical to those of FIG. 4. However, switching is ensured by an electrostatic transducer 90 constituted by a series of teeth 92-1, . . . , 92-6 and 94-1, . . . , 94-6 alternately connected to a mobile, central part 100 and to the fixed part. Each of these teeth carries control electrodes 96-1, 96-2, . . . , 96-12 and 98-1, . . . , 98-12. The teeth and electrodes are distributed on either side of the central beam 100 and the electrodes are pairwise associated with electric power supplies 102-1, . . . , 102-6 and 104-1, . . . , 104-6. Thus, it is possible to separately dimension the arms for holding the mobile structure and the electrostatic system, which makes it possible to further reduce the displacement control voltage. This also permits the separation of the problems linked with stresses present in the layers from the control voltage problems, the latter being solved by correctly dimensioning the electrostatic transducer.

Figure 5B:
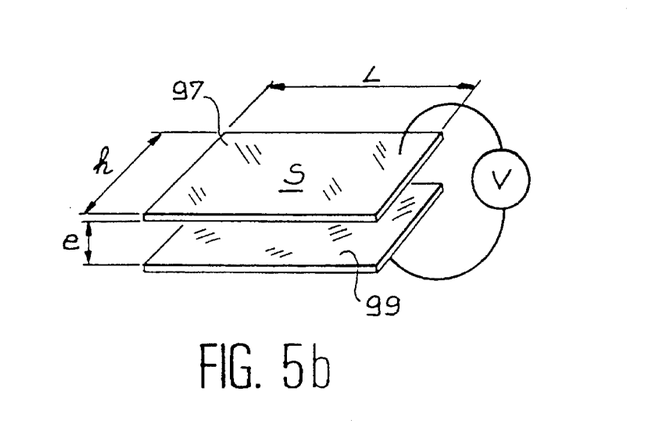
FIGS. 5b & 5c The dimensions of an electrostatic transducer.
Figure 5C:
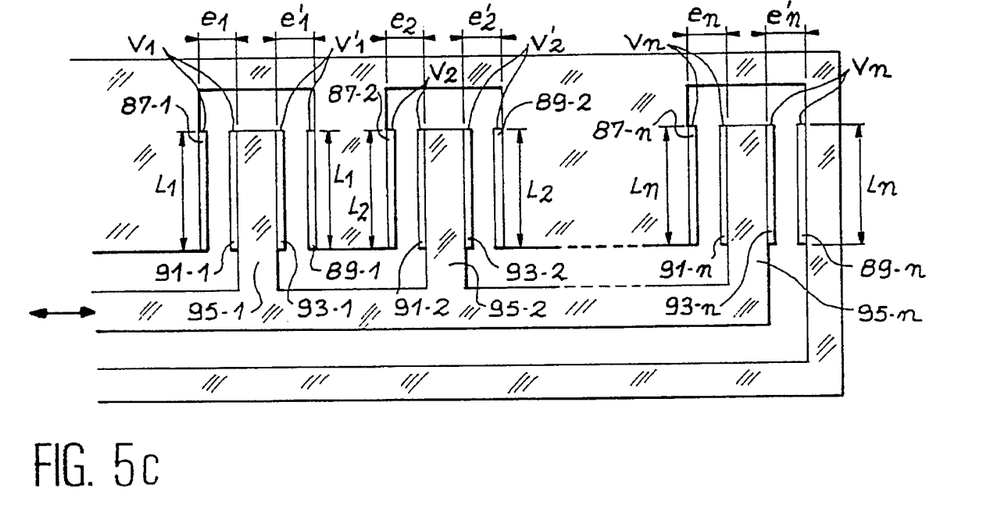

This dimensioning will now be briefly described in conjunction with FIGS. 5b and 5c. In the case of FIG. 5b, there are two facing electrodes at a distance e from one another, S representing the surface of each electrode (S=Lxh, in which L and h are respectively the length and width of the electrode), V being the voltage applied between the two electrodes and $\epsilon_0$ the permittivity of the vacuum ($\epsilon_0$=8.85·10$^{-12}$F/m). The electrostatic attraction force is given by F:

$$F=\frac{1}{2}\epsilon_0 S(V/e)^2.$$

On considering a single beam, as in the prior art, one of the two electrodes is then positioned on the flank of the beam and L and h respectively represent the length and height of the beam.

In the case of an electrostatic transducer with n teeth (cf. FIG. 5c) 95-1, 95-2, . . . , 95-n, each tooth 95-i carries two electrodes 91-i and 93-i and each of these electrodes faces an electrode 87-i and 89-i on the fixed part. $V_i$ represents the voltage between the electrode 87-i and the electrode 91-i and $V'_i$ represents the voltage between the electrode 93-i and the electrode 89-i. The force F making it possible to deflect the mobile structure to the left in FIG. 5c is given by:

$$F = 1/2\, \epsilon_0 \sum_{i=1}^{n} (L_i \cdot h \cdot (V_i/e_i)^2).$$

$L_i$ and $e_i$ representing the length of the electrodes on either side of the tooth 95-i and the distance between the electrode 87-i and the electrode 91-i.

The force F' making it possible to deflect the structure to the right of FIG. 5c is equal to:

$$F' = 1/2\, \epsilon_0 \sum_{i=1}^{n} (L'_i \cdot h' \cdot (V'_i/e'_i)^2)$$

On taking e.g. n identical transducer teeth of the same length L, the same height h and the same voltage V, the force is then given by: $F=n/2\epsilon_0 Lh(V/e)^2$.

Thus, the force is n times higher. Thus, for a given force the necessary voltage is $\sqrt{n}$ times lower. Thus, an electrostatic transducer makes it possible to reduce the control voltage.

Figure 6:
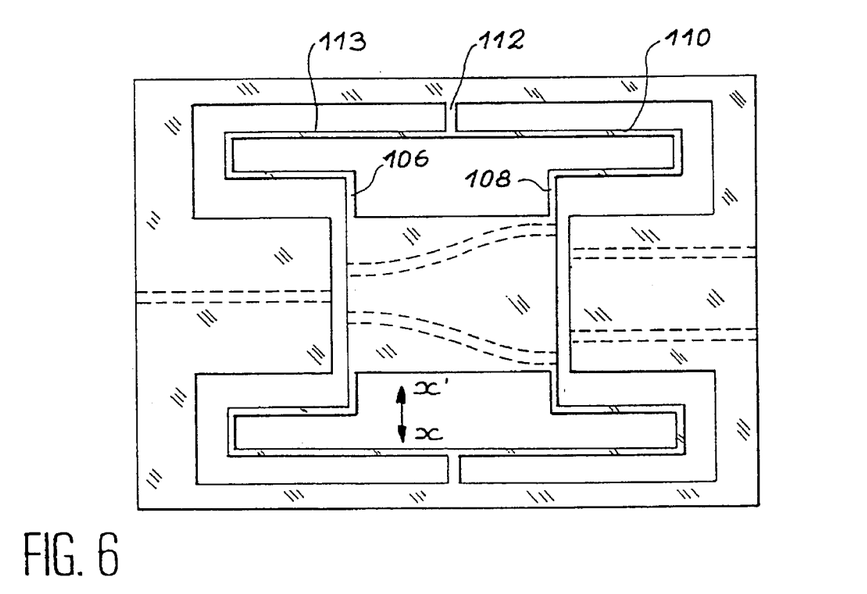
FIG. 6 A mobile part of a switch or sensor connected to the fixed part by arms in the form of a deformable frame.

The holding or fixing arms can have various shapes. In FIGS. 3a to 5a, the arms have an angle bracket shape with two substantially perpendicular segments. The fixing arms can also have the shape illustrated in FIG. 6, where two arms 106, 108 fixed to the mobile part, connect the latter to the fixed part by means of a deformable frame 110, which is itself connected to the fixed part by a connecting element 112. The same structure is provided on the other side of the mobile part. This device based on deformable frames enables the mobile part, when it is released by etching from its substrate, to deform without giving rise to a parasitic misalignment of the optical guides, or any significant deformation, e.g. mechanical buckling of the fixing arms. An electrostatic control can be introduced on the walls 113 of said deformable frame.

Figure 7:
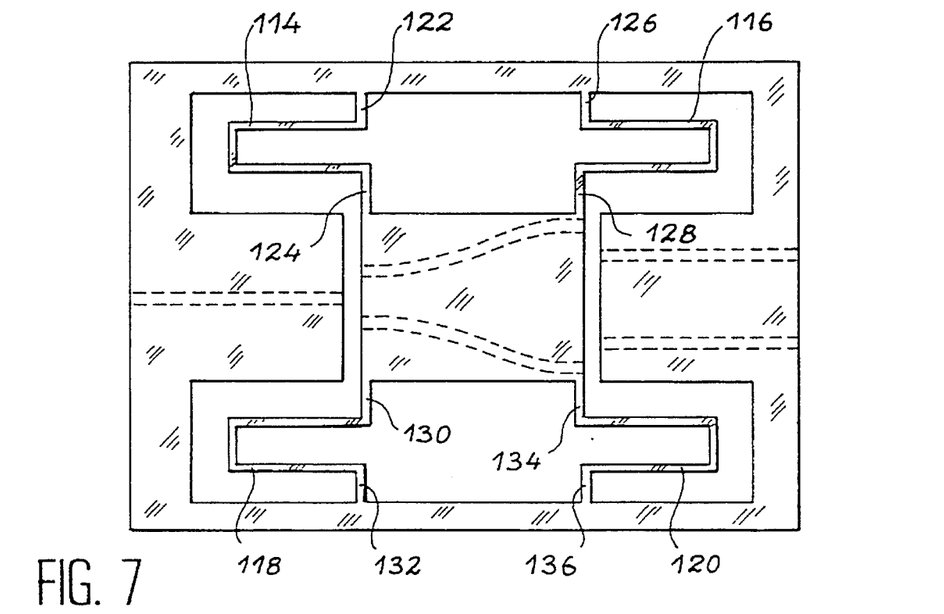
FIG. 7 A mobile part of a switch or a sensor connected to the fixed part by U-shaped arms.
Figure 8:
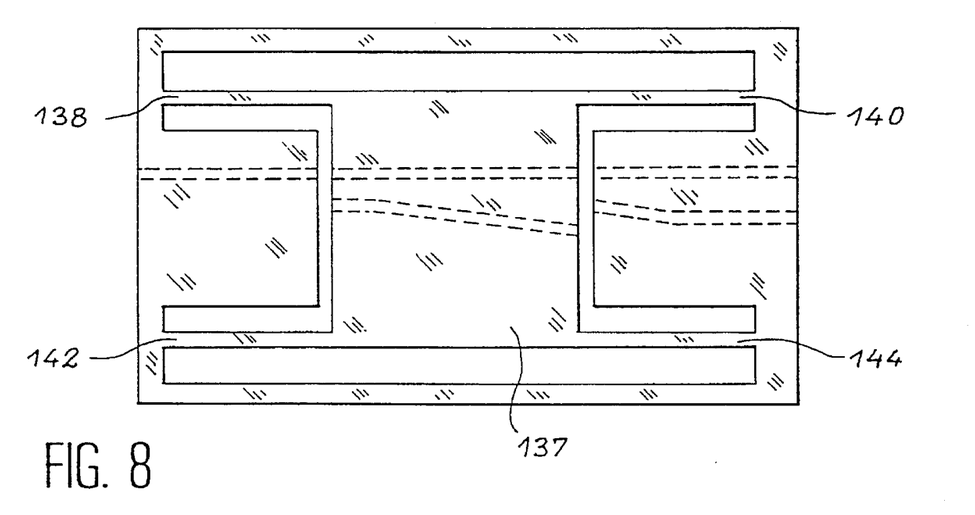
FIG. 8 A mobile part of a switch or a sensor connected to the fixed part by straight arms.

According to an embodiment illustrated in FIG. 7, the connecting arms can be U-shaped 114, 116, 118, 120, with a branch 122, 124, 126, 128, 130, 132, 134, 136 added to each free end of the U substantially perpendicular to the corresponding lateral branch of the U. According to another embodiment illustrated in FIG. 8, four straight arms 138, 140, 142, 144 extend the mobile part 137 in the direction of the fixed part.

Figure 9:
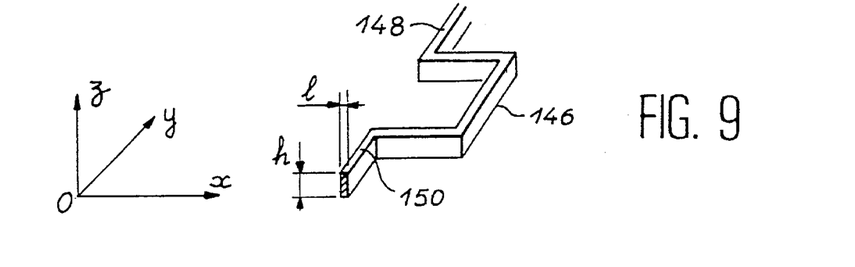
FIG. 9 In greater detail a U-shaped, compensating arm.

The arms are preferably rigid in the vertical direction (direction perpendicular to the plane of FIGS. 3a to 8) and flexible in the displacement direction of the mobile part. FIG. 9 shows a fixing arm with a U-shaped, central body 146 and a branch 148, 150 added to the free end of each lateral branch of the U, so as to be substantially perpendicular to said branch. It is then possible to act on the geometry of the arms by increasing the height/width shape factor, the height h and the width 1 being identified on FIG. 9 as the height of the section of the fixing arm in a vertical section (in accordance with a plane parallel to zx), the width 1 being the width of the said arm in the same vertical section. By acting on this shape factor, it is possible to obtain an adequate flexibility in the plane xy containing the first direction, so as not to hinder the displacements of the mobile part in said same plane and an adequate rigidity in direction z to limit possible deformations of the mobile part in said latter direction, also known as the second direction. This process, which consists of modifying the height and width of the section of a fixing arm can be applied to any arm having a straight shape (like that of FIG. 8) or shaped like a frame (as in FIG. 6) or shaped like an angle bracket (as in FIG. 4).

Figure 10:
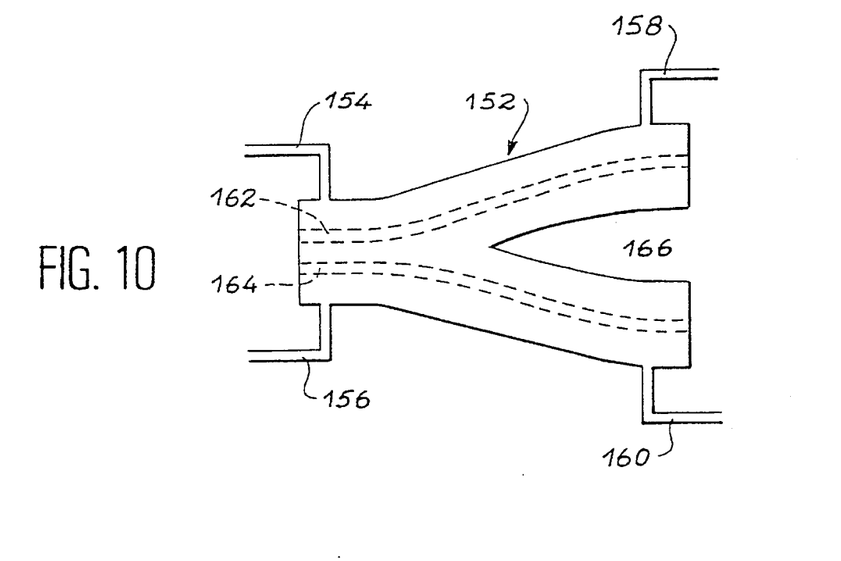
FIG. 10 A mobile part with its fixing arms having a shape ensuring a good guidance and minimizing its weight.

The mobile part can have various shapes. In FIGS. 3a to 8 it is shown having a substantially rectangular shape. However, it can also be given any other shape, particularly a shape which is optimized in order to minimize its weight. Thus, as shown in FIG. 10 where the fixing arms are designated by the references 154, 156, 158, 160, the mobile part can have two microguides 162, 164 and a shape ensuring a good guidance and minimizing its weight, particularly as a result of a cutout 166 between the two microguides 162, 164. The minimizing of the weight makes it possible to reduce the inertia of the system and therefore increase the switching speed, whilst decreasing the sensitivity of the switch to gravity. In the case of sensors, it is possible to increase the mobile mass, so as to increase the sensitivity of the sensor.

Figure 11:
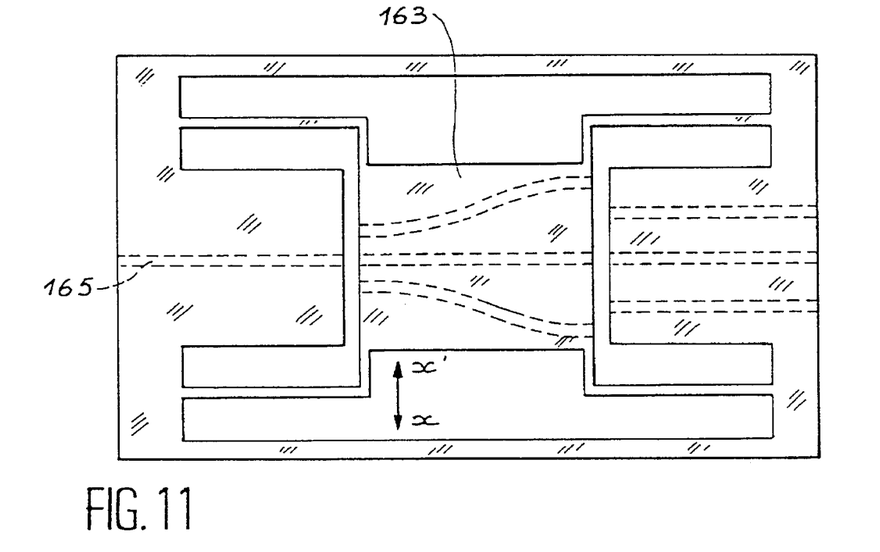
FIG. 11 A three-way optical sensor or switch.

FIGS. 3a to 10 show switching systems with two output guides. It is possible to generalize the teaching of the invention to switching with i output guides, as illustrated in FIG. 11. In this case, the mobile part 162 will e.g. contain i guides, each having an end which is to face the input microguide 164, whereas the other end faces one of the output microguides, for one of the i positions of the mobile part. In the case of the electrostatic control switch, the modulation of the voltage between two adjacent electrodes will make it possible to modulate a corresponding displacement of the mobile part.

Figure 12:
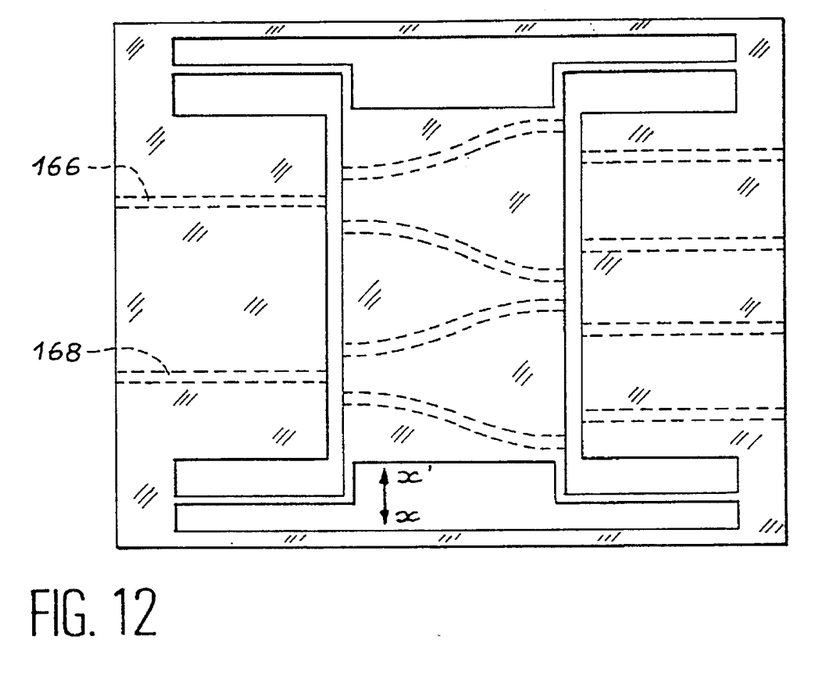
FIG. 12 A device permitting the parallel switching of two input guides on four output guides.

As illustrated in FIG. 12, the same mobile structure can have several guides permitting the switching of several input microguides in parallel. FIG. 12 is limited to the case of two input microguides 166, 168, but it is also possible to use an equivalent device for j input microguides, with j>2. The advantage of this device is that there is no increase in the control force, the fixing arm being independent of the optical structure used.

Figure 13:
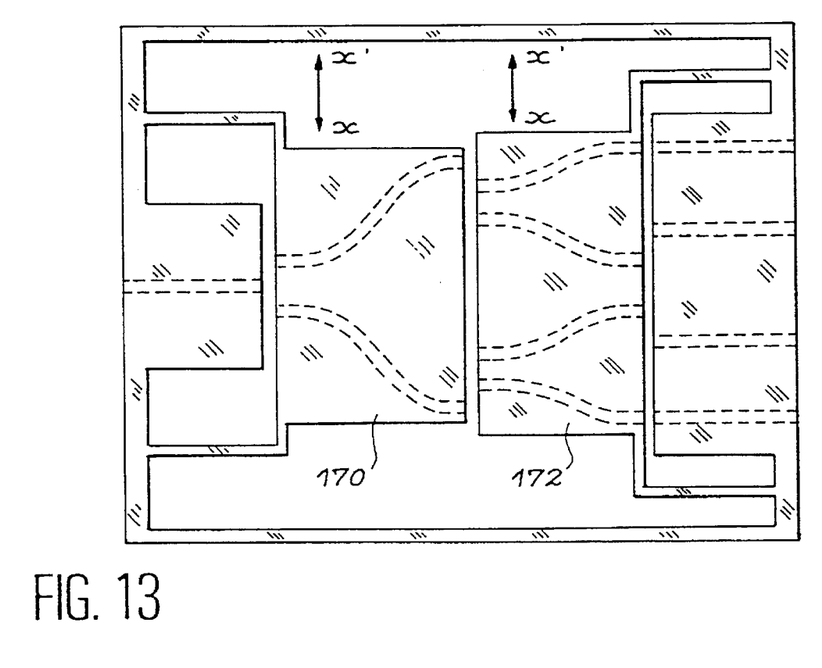
FIG. 13 Two independent mobile parts in cascade.

Moreover, as illustrated in FIG. 13, it is possible to cascade-connect mobile structures 170, 172, which can be interconnected (at least one being connected to the fixed part), or connected independently of one another to the fixed part of the device. It is this independent connection which is illustrated in FIG. 13.

The device illustrated in FIG. 13 can be generalized to an optomechanical device having, in an integrated optics guide structure, a fixed part like that of FIG. 13 and N mobile parts $M_1, M_2, \ldots M_N$. These mobile parts can either be interconnected or independently connected to the fixed part of the device. All the mobile parts are located in cascade between i output microguides and j input microguides, all formed in the fixed part. The fixing arms of each mobile part are like those described hereinbefore, particularly in conjunction with FIGS. 3a to 13. Each mass Mn has $k_n$ microguides. These microguides are arranged in such a way as to switch a light beam from one of the $k_{n-1}$ microguides of the mass $M_{n-1}$ located on one side of the mass $M_n$ towards one of the $k_{n+1}$ microguides of the mass $M_{n+1}$ located on the other side of the mass $M_n$.

Figure 14:
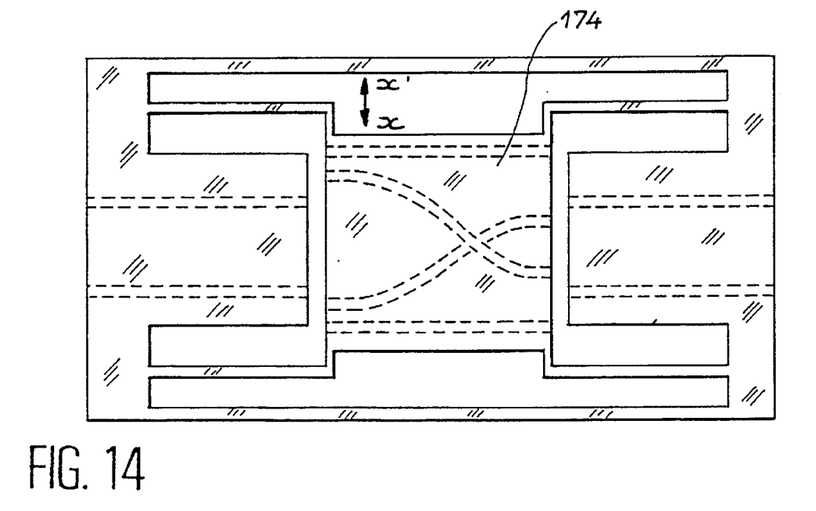
FIG. 14 A 2×2 switch with a single mobile part.

According to another variant illustrated in FIG. 14, it is possible to effect the control of j input microguides towards i output microguides, the sole mobile part 174 then having ixj microguides, each of which can connect the ends of two fixed microguides (one input guide, one output guide) for a particular position of the mobile part.

Figure 15:
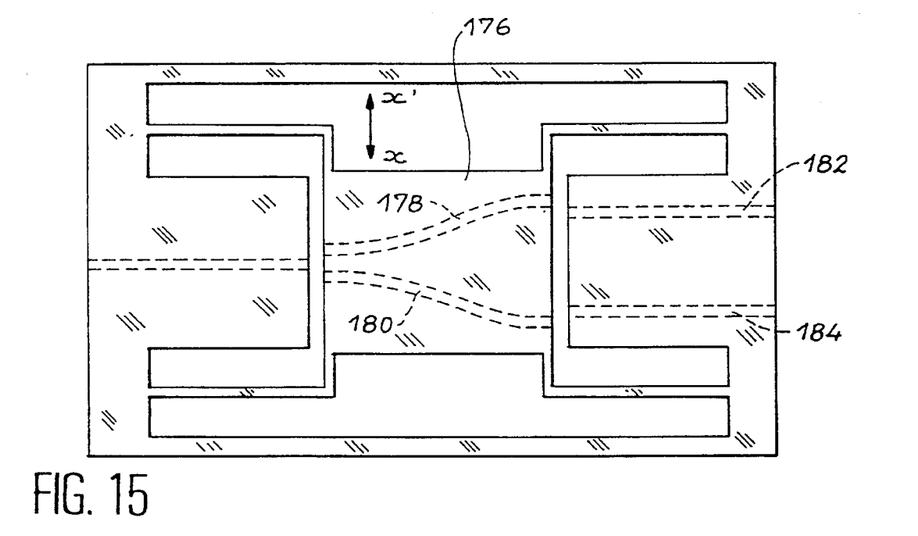
FIG. 15 An optical vibration pick-up or accelerometer.

Moreover, the structure used for the optical switch, during the switching of the input microguides to the output microguides, can be used for implementing a vibration or acceleration optomechanical sensor or pick-up. It can be advantageous in this application to move together the positions of the output microguides. A sensor having j=1 input microguide, i=2 output microguides and k=2 microguides in a mobile mass is illustrated in FIG. 15. A mobile part 176 having two curved microguides 178, 180 can undergo displacements in a direction XX' contained in the plane of the drawing and advantageously perpendicular to the input microguide, said displacements being induceable by any external force, whose presence is to be detected. In the case of such a displacement, the light carried by the input microguide is more coupled towards one or other of the output microguides, as a function of the displacement direction. Here again there is no guide connected to the fixed part, so that it is possible to use very thin holding arms, which leads to an increased sensitivity of the system.

Figure 16A:
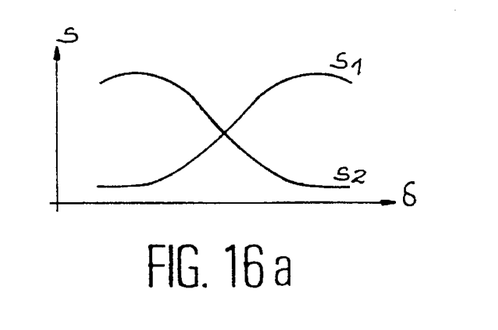
FIGS. 16a & 16b As a function of the displacement of the mobile part, the optical signals obtained by the output guides and the difference between these two signals.
Figure 16B:
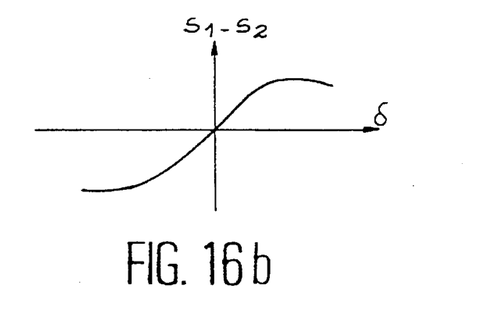

FIG. 16a shows the signals at the output of the microguide 182 (signal $S_1$) and the microguide 184 ($S_2$), as a function of the displacement δ of the mobile part. The difference between these two signals is shown in FIG. 16b as a function of the displacement δ of the mobile part. Thus, a signal is obtained which is proportional to the displacement of the mobile part, itself proportional to the acceleration applied to the device. FIG. 16b shows that it is possible to detect the mobile part displacement direction with respect to a position, e.g. with the latter at rest, in which the output signals are identical. The output microguides 182, 184 are also connected to means for detecting a beam transmitted via the microguides 178, 180. These known detection means are not shown in greater detail in FIG. 15. It is also possible to connect these detection means to means for processing the signals and optionally display means.

in the case of the optomechanical sensor described hereinbefore, the invention leads to an increased sensitivity of the mechanical system and makes it possible to detect the displacement direction of the structure. The fact that there is no optical constraint in the dimensioning of the holding arms permits, by acting on the geometry of said arms, to produce e.g. accelerometers which are sensitive to acceleration in one direction and insensitive in the two other perpendicular directions, which is not the case with an accelerometer functioning with the aid of optical switching.

All the devices described hereinbefore (switches, sensors) can be produced by using known processes, like those described hereinbefore in conjunction with the description of the prior part and e.g. using LPCVD, PECVD, anisotropic and isotropic etching of the reactive ionic etching type.

The following example is proposed for the numerical or digital application concerning the optomechanical switch.

The optical structure, which can e.g. be in the form of three layers deposited on an e.g. silicon substrate, said layers being e.g. of phosphorus-doped silica deposited by PECVD, the central layer having a high index than the other two layers surrounding it to ensure light confinement. The difference etching operations of the layers necessary for defining the guides and the mobile structure can take place by RIE. The vertical height of the optical structure is typically 25 μm.

In the case of the switch proposed in FR-A-2 660 444, the distributed force which it is wished to apply along the beam to obtain a certain displacement of the free end is given by the relation:

$$F = \frac{2Eh l^3 \delta}{3L^3}$$

which E is the Young's modulus of the material used for the beam, h the height of the beam, 1 the width of the beam, δ the displacement of the free end of the beam and L the total length of the beam.

The dimensions of the mobile beam are typically a few millimetres long, 25 μm high and approximately 25 to 30 μm wide. A lesser width would disturb the optical guidance in the beam and would lead to parasitic losses. Assuming a silica beam of Young's modulus $E=7.10^7$ Pa, of length L=2 mm, height h=25 μm, width l=30 μm, the force necessary for displacing the free end of the beam by δ=10 μm is $F=4.10^{-5}$ N.

In the case of an electrostatic force created by a voltage applied to electrodes on either side of the beam, the voltage to be applied is given by the formula:

$$V = e \sqrt{\frac{2F}{\epsilon_0 L h}}$$

in which V is the voltage between the electrodes, e the distance between the electrodes, $\epsilon_0$ the permittivity of the vacuum and L the length of the beam. On taking $\epsilon_0 = 8.85 \cdot 10^{-12}$ F/m, an interelectrode distance of 30 μm and the other parameters as defined hereinbefore, a voltage of V=400 volts is obtained.

Now taking a switch based on the same technology and the same guide dimensions and using the present invention, the mobile part is connected to the fixed part with the aid of four arms having a width 1 of 5 μm and the same length L=2 mm, the force necessary for the deviation of the four arms then being given by:

$$F = \frac{8Eh l^3 \delta}{L^3} = 2.2 \cdot 10^{-6} N$$

The force to be applied is consequently 18 times lower. Moreover, this force can be distributed over the four arms and the force to be applied to each arm is consequently four times lower.

In the case of the electrostatic control, placing electrodes on each of the four arms, the voltage to be applied will be given by:

$$V = e \sqrt{\frac{F}{2\epsilon_0 L h}}$$

Using the same interelectrode distance, we obtain V=47 volts, i.e. a voltage more than 8 times lower than in the previous case.

The industrial applications of the present invention are mainly in the field of optical telecommunications or optomechanical switching, so as to permit the production of so-called safe networks. Other applications are in the field of optomechanical sensors and in particular in accelerometry, microphonics, vibration detection and pressure measurement, all by optical procedures. In general terms, the invention is applicable to any integrated optomechanical device, where it is necessary to mechanically displace the end of an integrated optical guide.

We claim:

1. Optomechanical device comprising in an integrated optics guiding structure, a fixed part and a mobile part, which is connected to the fixed part, said mobile part being located between i output microguides formed in the fixed part and j input microguides also formed in the fixed part, the mobile part comprising a mass, which is only connected by fixing arms to the fixed part, so as to permit the displacement of the mass in a first direction, said mass having k microguides to permit the switching of a light beam from one of the j input microguides to one of the i output microguides.

2. Optomechanical device having, in an integrated optics guide structure, a fixed part and N mobile parts $M_1, M_2, \ldots, M_n$ connected to the fixed part, said mobile parts being positioned between i output microguides formed in the fixed part and j input microguides also formed in the fixed part, the mobile parts each having a mass, which is only connected by fixing arms to the fixed part so as to permit the displacement of the mass in a first direction, the mass $M_1$ having $k_1$ microguides so as to be able to switch a light beam from one of the j input microguides to one of the $k_2$ microguides of the mass $M_2$, each mass $M_n$ (n being equal to or higher than 2) having $k_n$ microguides so as to be able to switch a light beam from one of the $k_{n-1}$ microguides of the mass $M_{n-1}$ towards one of the $k_{n+1}$ microguides of the mass $M_{n+1}$, the mass $M_N$ having $k_N$ microguides so as to be able to switch a light beam from one of the $k_{N-1}$ microguides of the mass $M_{N-1}$ to one of the i output microguides.

3. Device according to claim 1 wherein, one of the masses is connected the fixing arms by at least two points (A, B, C, D).

4. Device according to claims 1 wherein, at least one arm has an adequate flexibility in the first direction, so as not to hinder the displacement of the mobile part in said first direction, and an adequate rigidity in a second direction, so as to limit the deformations of the mobile part in said second direction.

5. Device according to claim 1, wherein the first and second directions are perpendicular to one another.

6. Device according to claim 1 wherein, at least one of the fixing arms of at least one mobile part has an angle bracket shape with two segments perpendicular to one another.

7. Device according to claim 1 wherein, at least one arm of at least one mobile mass has a U-shaped body with a branch added to the free end of each lateral branch of the U substantially perpendicular to said branch.

8. Device according to claim 1 wherein, one of the arms of at least one mobile mass is straight.

9. Device according to claim 1 wherein, at least two arms of a mobile mass connect said mobile mass to the fixed part by means of a deformable frame.

10. Device according to claim 1 wherein, at least one mobile part has, apart from the k microguides, at least one cutout lightening said mobile part.

11. Optomechanical switch comprising an optomechanical device, the optomechanical device comprising in an integrated optics guiding structure, a fixed part and a mobile part, which is connected to the fixed part, said mobile part being located between i output microguides formed in the fixed part and j input microguides also formed in the fixed part, comprising a mass, which is only connected by fixing arms to the fixed part, so as to permit the displacement of the mass in a first direction, said mass having k microguides to permit the switching of a light beam from one of the j input microguides to one of the i output microguides, said optomechanical switch further comprising means for controlling the displacement of the or at least one of the mobile parts.

12. Switch according to claim 11, wherein the means for controlling the displacement is electrostatic means.

13. Switch according to claim 12, wherein control electrodes are applied to the arms of at least one mobile part.

14. Switch according to claim 12, wherein at least one mobile part is connected to an electrostatic transducer forming the control means.

15. Optomechanical device according to claim 1, wherein said optomechanical device is incorporated in an optomechanical sensor.

16. Device according to claim 2, wherein one of the masses is connected to fixing arms by at least two points (A, B, C, D).

17. Device according to claim 2, wherein at least one arm has an adequate flexibility in the first direction, so as not to hinder the displacement of the mobile part in said direction, and an adequate rigidity in a second direction, so as to limit the deformations of the mobile part in said second direction.

18. Device according to claim 2, wherein at least one of the fixing arms of at least one mobile part having an angle bracket shape with two segments perpendicular to one another.

19. Device according to claim 2, wherein at least one arm of at least one mobile mass has a U-shaped body with a branch added to the free end of each lateral branch of the U substantially perpendicular to said branch.

20. Device according to claim 2, wherein one of the arms of at least one mobile mass is straight.

21. Device according to claim 2, wherein at least two arms of a mobile mass connects said mobile mass to the fixed part by means of a deformable frame.

22. Device according to claim 2, wherein at least one mobile part has, apart from the k microguides, at least one cutout lightening said mobile part.

23. Optomechanical switch comprising an optomechanical device, the optomechanical device having, in an integrated optics guide structure, a fixed part and N mobile parts $M_1, M_2, \ldots, M_n$ connected to the fixed part, said mobile parts being positioned between i output microguides formed in the fixed part and j input microguides also formed in the fixed part, the mobile parts each having a mass, which is only connected by fixing arms to the fixed part so as to permit the displacement of the mass in a first direction, the mass $M_1$ having $k_1$ microguides so as to be able to switch a light beam from one of the j input microguides to one of the $k_2$ microguides of the mass $M_2$, each mass $M_n$ (n being equal to or higher than 2) having $k_n$ microguides so as to be able to switch a light beam from one of the $k_{n-1}$ microguides of the mass $M_{n-1}$ towards one of the $k_{n+1}$ microguides of the mass $M_{n+1}$, the mass $M_N$ having $k_N$ microguides so as to be able to switch a light beam from one of the $k_{N-1}$ microguides of the mass $M_{N-1}$ to one of the i output microguides, said optomechanical switch further comprising means for controlling the displacement of the or at least one of the mobile parts.

24. Optomechanical device according to claim 2, wherein said optomechanical device is incorporated in an optomechanical sensor.

* * * * *